US010131790B2

(12) United States Patent
Fujita et al.

(10) Patent No.: US 10,131,790 B2
(45) Date of Patent: Nov. 20, 2018

(54) INFRARED-REFLECTIVE PIGMENT AND INFRARED-REFLECTIVE COATING COMPOSITION

(71) Applicant: NIPPON PAINT HOLDINGS CO., LTD., Osaka (JP)

(72) Inventors: Takeshi Fujita, Tokyo (JP); Go Suzuki, Tokyo (JP); Yoichi Adachi, Tokyo (JP)

(73) Assignee: Nippon Paint Holdings Co., Ltd., Osaka (JP)

( * ) Notice: Subject to any disclaimer, the term of this patent is extended or adjusted under 35 U.S.C. 154(b) by 0 days.

(21) Appl. No.: 15/324,159

(22) PCT Filed: Jul. 9, 2015

(86) PCT No.: PCT/JP2015/069794
§ 371 (c)(1),
(2) Date: Jan. 5, 2017

(87) PCT Pub. No.: WO2016/006664
PCT Pub. Date: Jan. 14, 2016

(65) Prior Publication Data
US 2017/0174893 A1    Jun. 22, 2017

(30) Foreign Application Priority Data
Jul. 10, 2014 (JP) .................. 2014-142719

(51) Int. Cl.
C09C 3/08        (2006.01)
C09D 133/00      (2006.01)
(Continued)

(52) U.S. Cl.
CPC .......... *C09C 1/0078* (2013.01); *C09C 1/0015* (2013.01); *C09C 3/006* (2013.01);
(Continued)

(58) Field of Classification Search
CPC ....... C09C 1/0078; C09C 3/006; C09C 3/066; C09C 3/08; C09D 5/004; C09D 17/006;
(Continued)

(56) References Cited

U.S. PATENT DOCUMENTS 4,236,934 A * 12/1980 Bell .................. C09C 1/646
106/404
5,571,624 A    11/1996 Phillips et al.
(Continued)

FOREIGN PATENT DOCUMENTS

CA    2180669 A1    1/1997
CA    2203585       10/1997
(Continued)

OTHER PUBLICATIONS

Notification of Reasons for Refusal for Japanese Patent Application No. 2016-532971, dated Jan. 31, 2017 (4 pages).
(Continued)

*Primary Examiner* — Pegah Parvini
(74) *Attorney, Agent, or Firm* — Muncy, Geissler, Olds & Lowe, P.C.

(57) ABSTRACT

To provide an infrared-reflective pigment and infrared-reflective coating composition provided with both high infrared-light reflecting properties and high visible-light transparency. Provided is a flake-shaped infrared-reflective pigment, the infrared-reflective pigment 1 characterized by being provided with a layered body 13 having at least one metal thin-film layer 11 and at least two transparent dielectric layers 12, the film thickness of the dielectric layer 12 being (an integer multiple of $\lambda/4n$)±10 nm, where $\lambda$ is the wavelength of incident light in a visible-light peripheral region and n is the refractive index of the dielectric layer 12. Also provided is an infrared-reflective coating composition containing the infrared-reflective pigment 1.

4 Claims, 2 Drawing Sheets

(51) Int. Cl.
  *C09C 1/00* (2006.01)
  *C09D 7/40* (2018.01)
  *C09D 201/00* (2006.01)
  *C09C 3/00* (2006.01)
  *C09C 3/06* (2006.01)
  *C09D 5/33* (2006.01)
  *C09D 17/00* (2006.01)

(52) U.S. Cl.
  CPC ............... *C09C 3/066* (2013.01); *C09C 3/08* (2013.01); *C09D 5/004* (2013.01); *C09D 7/40* (2018.01); *C09D 17/006* (2013.01); *C09D 17/007* (2013.01); *C09D 17/008* (2013.01); *C09D 133/00* (2013.01); *C09D 201/00* (2013.01); *C09C 2200/1008* (2013.01); *C09C 2200/1054* (2013.01); *C09C 2200/304* (2013.01); *C09C 2200/401* (2013.01); *C09C 2200/403* (2013.01); *C09C 2210/10* (2013.01); *C09C 2210/20* (2013.01)

(58) Field of Classification Search
  CPC ... C09D 17/007; C09D 17/008; C09D 133/00
  See application file for complete search history.

(56) References Cited

U.S. PATENT DOCUMENTS

| | | | |
|---|---|---|---|
| 5,624,486 | A | 4/1997 | Schmid et al. |
| 5,958,125 | A | 9/1999 | Schmid et al. |
| 6,013,370 | A | 1/2000 | Coulter et al. |
| 6,063,179 | A | 5/2000 | Schmid et al. |
| 6,132,504 | A | 10/2000 | Kuntz et al. |
| 6,156,115 | A | 12/2000 | Pfaff et al. |
| 6,383,638 | B1 | 5/2002 | Coulter et al. |
| 6,569,529 | B1* | 5/2003 | Phillips ................ C09C 1/0015 106/403 |
| 6,747,073 | B1 | 6/2004 | Pfaff et al. |
| 7,763,108 | B2 | 7/2010 | Oyanagi et al. |
| 8,556,401 | B2 | 10/2013 | Oyanagi et al. |
| 2003/0215627 | A1 | 11/2003 | Rosenberger et al. |
| 2004/0071957 | A1 | 4/2004 | Fujita |
| 2004/0219344 | A1 | 11/2004 | Andes et al. |
| 2005/0208303 | A1 | 9/2005 | Atarashi et al. |
| 2006/0275596 | A1* | 12/2006 | Payne .................... B82Y 5/00 428/323 |
| 2008/0145628 | A1 | 6/2008 | Oyanagi et al. |
| 2008/0250970 | A1 | 10/2008 | Oyanagi et al. |
| 2009/0054534 | A1 | 2/2009 | Kitamura |
| 2010/0203093 | A1 | 8/2010 | Bujard et al. |
| 2010/0242793 | A1* | 9/2010 | Greb ...................... C09C 1/62 106/31.65 |
| 2011/0237683 | A1 | 9/2011 | Schmid et al. |

FOREIGN PATENT DOCUMENTS

| | | |
|---|---|---|
| CN | 101688067 A | 3/2010 |
| EP | 0753545 A2 | 1/1997 |
| JP | 52-119482 A | 10/1977 |
| JP | 2-173060 A | 7/1990 |
| JP | 5-78544 A | 3/1993 |
| JP | 6-093206 A | 4/1994 |
| JP | 7-258579 A | 10/1995 |
| JP | 9-031355 A | 2/1997 |
| JP | 9-508172 A | 8/1997 |
| JP | 10-60303 A | 3/1998 |
| JP | 10-81837 A | 3/1998 |
| JP | 2000-507208 A | 6/2000 |
| JP | 2000-511587 A | 9/2000 |
| JP | 2000-511968 A | 9/2000 |
| JP | 2001-26801 A | 1/2001 |
| JP | 2001-262016 A | 9/2001 |
| JP | 2002-020647 A | 1/2002 |
| JP | 2002-500258 A | 1/2002 |
| JP | 2002-528639 A | 9/2002 |
| JP | 2002-535435 A | 10/2002 |
| JP | 2002-320912 A | 11/2002 |
| JP | 2003-113330 A | 4/2003 |
| JP | 2004-004840 A | 1/2004 |
| JP | 2004-512394 A | 4/2004 |
| JP | 2004-162020 A | 6/2004 |
| JP | 2005-298905 A | 10/2005 |
| JP | 2006-506518 A | 2/2006 |
| JP | 2008-511704 A | 4/2008 |
| JP | 2008-174712 A | 7/2008 |
| JP | 2010-530448 A | 9/2010 |
| JP | 2010-532808 A | 10/2010 |
| JP | 2011-173943 A | 9/2011 |
| JP | 2013-518953 A | 5/2013 |
| WO | WO00/24946 A1 | 5/2000 |
| WO | WO 03/076526 | 9/2003 |
| WO | WO2004/044060 A1 | 5/2004 |
| WO | WO2006/021528 A2 | 3/2006 |
| WO | WO2007/117004 A1 | 10/2007 |
| WO | WO2009/007248 A1 | 1/2009 |

OTHER PUBLICATIONS

Extended European search report issued to EP Patent Application No. 15818518.1 dated Dec. 13, 2017; pp. 1-7.
Office Action issued to Chinese Application No. 201580037546.7, dated Mar. 1, 2018, 6 pages.
Office Action issued in corresponding JP Application No. 2016-532971 dated Sep. 13, 2016, 4 pages.

* cited by examiner

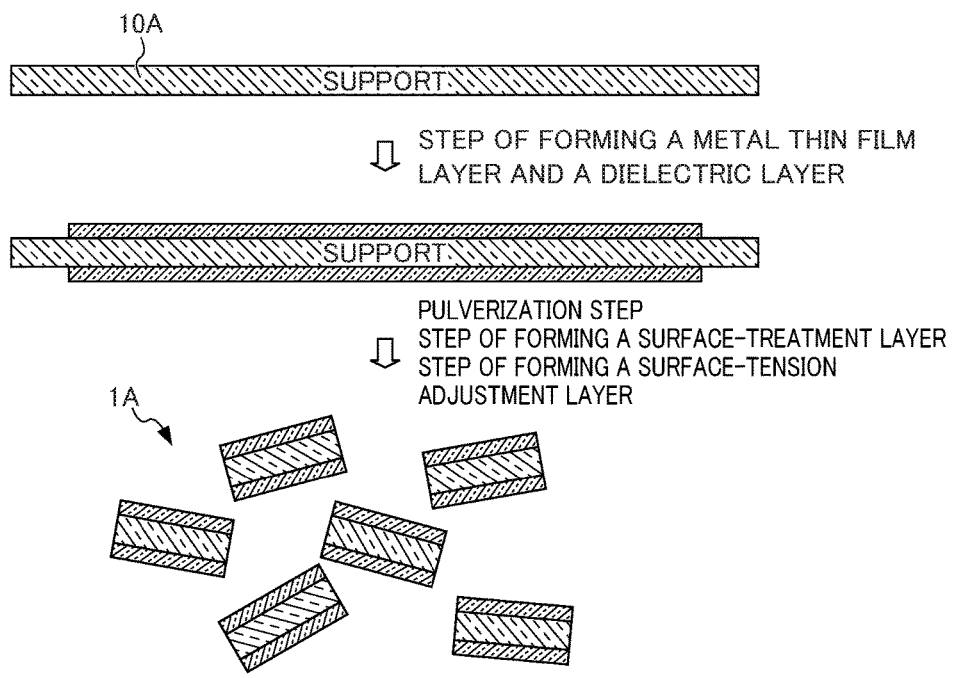

INFRARED-REFLECTIVE PIGMENT AND INFRARED-REFLECTIVE COATING COMPOSITION

TECHNICAL FIELD

The present invention relates to an infrared-reflective pigment and an infrared-reflective coating composition. More specifically, the present invention relates to an infrared-reflective pigment and an infrared-reflective coating composition having both high infrared-light reflectivity and high visible-light transparency.

BACKGROUND ART

In recent years, various thermal insulation coating materials have been proposed for forming thermal insulation coating films on building roofs and roads as one of the increasingly demanding energy-saving measures (for example, see Patent Documents 1 and 2). Coloring of these thermal insulation coating materials may be performed by a technique according to the subtractive color mixing method using a pigment with high infrared-light reflectance, such as titanium dioxide.

Meanwhile, a pigment having infrared-light reflective capability may, in nature, reflect visible-light as well. The selection of pigments in coloring may also be very limited. For example, a coloring pigment with less infrared-light absorption needs to be selected. Further, a dark color system such as black in particular may reduce infrared-light reflectance because of its low content ratio of titanium dioxide in a pigment. Therefore, the above technologies currently can not be used for applications requiring sophisticated designs such as automobile bodies. To meet requirements for these uses, there have been demands for an infrared-reflective pigment having both high infrared-light reflectivity and high visible-light transparency.

For example, as pigments which can reflect infrared light, but allow visible light to transmit, proposed are those including transparent electrically-conductive inorganic particulates such as ITO (tin-doped indium oxide) and ATO (antimony-doped tin oxide) (For example, see Patent Document 3), those including nano-sized hexaboride particulates as a heat-ray insulation component (for example, see Patent Document 4), optical coherence pigments with multilayered films of oxides (for example, see Patent Document 5). Heat-ray insulation plates also have been proposed in which titanium dioxide, or inorganic particles such as mica coated with titanium dioxide, which have heat-ray reflective capability, are kneaded in a transparent resin (for example, see Patent Documents 6 and 7).

Patent Document 1: Japanese Unexamined Patent Application, Publication No. 2002-20647
Patent Document 2: Japanese Unexamined Patent Application, Publication No. 2002-320912
Patent Document 3: Japanese Unexamined Patent Application, Publication No. 2001-262016
Patent Document 4: Japanese Unexamined Patent Application, Publication No. 2004-162020
Patent Document 5: Japanese Unexamined Patent Application, Publication No. 2004-4840
Patent Document 6: Japanese Unexamined Patent Application, Publication No. H05-78544
Patent Document 7: Japanese Unexamined Patent Application, Publication No. H02-173060

DISCLOSURE OF THE INVENTION

Problems to be Solved by the Invention

However, the pigment of Patent Document 3 suffers from absorption of near-infrared light. The pigment of Patent Document 4 suffers from poor visible-light transparency although it has high infrared reflectance. The pigment of Patent Document 5 suffers from a narrow wavelength region of reflectable infrared light. Moreover, the heat-ray insulation plates of Patent Documents 6 and 7 suffer from low heat-ray reflectance of inorganic particles themselves as well as reflection of visible light on the interface between resin and titanium dioxide.

The present invention is made in view of the aforementioned circumstances. An object of the present invention is to provide an infrared-reflective pigment and an infrared-reflective coating composition having both high infrared-light reflectivity and high visible-light transparency.

Means for Solving the Problems

In order to achieve the above object, the present invention provides a scale-like infrared-reflective pigment, comprising a layered body including at least one metal thin film layer and at least two transparent dielectric layers, the thicknesses of the dielectric layers being (an integral multiple of $\lambda/4n$) $\pm 10$ nm wherein $\lambda$ is a wavelength of an incident light at around the visible light region, and n is the refractive index of each of the dielectric layers.

The above metal thin film layer preferably includes at least one selected from the group consisting of silver, aluminum, copper, gold, palladium, zinc, titanium, chromium, and silicon.

The above dielectric layers preferably include at least one selected from the group consisting of titanium dioxide, zinc oxide, aluminum oxide, zirconium oxide, silicon dioxide, tin oxide, tin-doped indium oxide, and antimony-doped tin oxide.

A surface-treatment layer including an oxide and covering a surface of the above layered body is preferably further provided.

The above surface-treatment layer preferably includes at least one selected from the group consisting of aluminum oxide, silica, and zirconium oxide.

A surface-tension adjustment layer including a surface tension modifier and covering a surface of the above surface-treatment layer is preferably further provided.

The above surface-tension adjustment layer preferably includes a surface tension modifier containing stearic acid.

Moreover, the present invention provides infrared-reflective coating compositions each containing the infrared-reflective pigment described above.

Effects of the Invention

The present invention can provide an infrared-reflective pigment and an infrared-reflective coating composition having both high infrared-light reflectivity and high visible-light transparency. A coating film which can reflect infrared light without spoiling a sophisticated design can in turn be provided, and will now be used for various applications.

BRIEF DESCRIPTION OF THE DRAWINGS

FIG. 3 shows a second method of manufacturing an infrared-reflective pigment according to the present embodiment.

PREFERRED MODE FOR CARRYING OUT THE INVENTION

Below, embodiments of the present invention will be described in detail with reference to the drawings.

[Infrared-Reflective Pigment]

The infrared-reflective pigment according to the present embodiment is a scale-like (plate-shaped) pigment having both high infrared-light reflectivity and high visible-light transparency. The infrared-reflective pigment according to the present embodiment is oriented such that the flat side thereof is parallel to a surface of a coating film when blended to form the coating film. This enables higher infrared reflectivity and higher visible-light transparency.

The infrared-reflective pigment according to the present embodiment includes a layered body having at least one metal thin film layer and at least two transparent dielectric layers.

Figure 1:
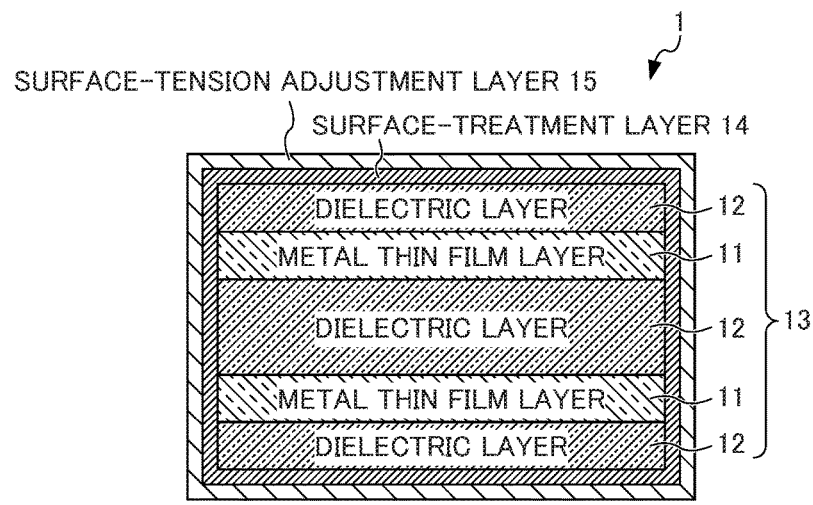
FIG. 1 schematically shows a cross-sectional structure of an infrared-reflective pigment according to one embodiment of the present invention.

FIG. 1 schematically shows a cross-sectional structure of an infrared-reflective pigment according to the present embodiment. As shown in FIG. 1, an infrared-reflective pigment 1 as one example of the infrared-reflective pigment according to the present embodiment includes a layered body 13 having total five layers of two metal thin film layers 11 and three transparent dielectric layers 12 in which the metal thin film layers 11 and dielectric layers 12 are layered in an alternate fashion.

Note that the layered body 13 in the infrared-reflective pigment 1 according to the present embodiment is not limited to the five-layer structure as shown in FIG. 1, and will suffice as long as it has at least one metal thin film layer 11 and at least two transparent dielectric layers 12. There is no particular limitation for the number of layers, but the metal thin film layer(s) 11 and the dielectric layers 12 are preferably layered in an alternate fashion.

Moreover, the infrared-reflective pigment 1 according to the present embodiment preferably further includes a surface-treatment layer 14 covering a surface of the layered body 13, and a surface-tension adjustment layer 15 covering the surface-treatment layer 14 as shown in FIG. 1.

Below, the structure of each layer of the metal thin film layer 11, the dielectric layer 12, the surface-treatment layer 14, and the surface-tension adjustment layer 15 will be described in detail.

The metal thin film layer 11 has a function to reflect infrared light. The infrared-reflective pigment 1 according to the present embodiment is configured to include the layered body 13 having the metal thin film layer 11, and thus can show high infrared reflectivity.

The metal thin film layer 11 preferably includes at least one selected from the group consisting of silver, aluminum, copper, gold, palladium, zinc, titanium, chromium, and silicon. Among these, a metal thin film layer which includes silver is more preferably used.

Note that when multiple metal thin film layers 11 are provided, each of the multiple metal thin film layers 11 is preferably formed from the same material in view of manufacture. However, the multiple metal thin film layers 11 may be formed from different materials.

The metal thin film layer 11 preferably has a film thickness of 8 to 20 nm. The metal thin film layer 11 does not provide sufficient infrared-light reflectivity when it has a film thickness of less than 8 nm. The metal thin film layer 11 does not provide sufficient visible-light transparency when it has a film thickness of more than 20 nm. More preferably, the metal thin film layer 11 has a film thickness of 10 to 14 nm.

The dielectric layers 12 are transparent and functions as antireflective layers of the metal thin film layer 11 at around the visible light region. That is, the dielectric layers 12 have a function to improve the transmittance of an incident light at around the visible light region. The infrared-reflective pigment 1 according to the present embodiment is configured to include the layered body 13 having the dielectric layers 12, and thus can show high visible-light transparency.

The dielectric layers 12 preferably include at least one selected from the group consisting of titanium dioxide, zinc oxide, aluminum oxide, zirconium oxide, silicon dioxide, tin oxide, tin-doped indium oxide (ITO), and antimony-doped tin oxide (ATO). Among these, titanium dioxide, which has the highest refractive index, is more preferably used.

Note that each of the dielectric layers 12 is preferably formed from the same material, but may be formed from different materials.

The optical film thickness of a dielectric layer 12 is an integral multiple of $\lambda/4\pm10$ nm wherein $\lambda$ is a wavelength of an incident light at around the visible light region. In other words, the film thickness of a dielectric layer 12 is an integral multiple of $\lambda/4n\pm10$ nm wherein $\lambda$ is a wavelength of an incident light at around the visible light region, and n is the refractive index of the dielectric layer 12. When the film thickness of a dielectric layer 12 is an integral multiple of $\lambda/4n\pm10$ nm, the light interference effect can improve visible light transparency. Note that the aforementioned integer is preferably 1 to 4 in view of visible light transmittance.

Here, the wavelength at around the visible light region corresponds to the visible light region of 380 to 780 nm and a region therearound, and more specifically corresponds to 180 to 980 nm. The refractive index, n, can be measured with, for example, an ellipsometer from HORIBA, Ltd. or J. A. Woolam JAPAN.

Specifically, in the infrared-reflective pigment 1 with a five-layer structure as shown in FIG. 1, the film thickness of a dielectric layer 12 arranged at the center is, for example, $\lambda/2n$ (the optical film thickness is $\lambda/2$), and the film thicknesses of two dielectric layers 12 arranged at the outermost regions is $\lambda/4n$ (the optical film thickness is $\lambda/4$).

The surface-treatment layer 14 covering the entire surface of the layered body 13 has a function to prevent deterioration of resin due to direct contact with the dielectric layer 12 and the metal thin film layer 11 when the infrared-reflective pigment 1 is blended to form a coating film. As shown in FIG. 1 in more detail, the two outermost dielectric layers 12 of the layered body 13 (the top and bottom layers in FIG. 1) and the both end surface portions of each layer in the direction perpendicular to the layering direction of the layered body 13 (hereinafter, simply referred to as the end surface portions) make direct contact with resin when the layered body 13 is directly blended to form a coating film. Then, this will result in direct contact of resin with metal in each layer, and may deteriorate resin due to oxidation by the action of the metal and the like, which in turn may impair weather resistance. In contract, according to the present embodiment, the surface-treatment layer 14 covering the entire surface of the layered body 13 can avoid direct contact of resin with metal to inhibit deterioration of resin, leading to an infrared-reflective coating film having excellent weather resistance.

When the dielectric layer 12 is formed from titanium dioxide, in particular, direct blending of the layered body 13 to form a coating film brings titanium dioxide to make direct contact with resin, resulting in promoted deterioration of resin due to the photocatalytic action of titanium dioxide. In contract, according to the present embodiment, the surface-treatment layer 14 covering the entire surface of the layered body 13 can avoid direct contact of titanium dioxide with resin to inhibit promoted deterioration of resin due to the photocatalytic action of titanium dioxide.

Preferably, the surface-treatment layer 14 is transparent, and has a low refractive index. Specifically, the surface-treatment layer 14 preferably includes at least one selected from the group consisting of aluminum oxide, silica, and zirconium oxide. Among these, aluminum oxide is most preferred in view of infrared reflectivity and visible-light transparency, and silica is preferably used second to it. This order of preference is based on the order of the adsorbability of a surface tension modifier such as stearic acid present in a surface-tension adjustment layer 15 covering the surface-treatment layer 14 described below. That is, aluminum oxide, which can most easily adsorb a surface tension modifier such as stearic acid, may also serve as an adsorptive base for the surface-tension adjustment layer 15.

The surface-treatment layer 14 preferably has a film thickness of 1 to 15 nm. When the film thickness of the surface-treatment layer 14 falls within the above range, the effects of preventing deterioration of resin and the function as a base for the surface-tension adjustment layer as described above are assured without impairing the optical properties of infrared-reflective pigment according to the present invention. More preferably the film thickness is 5 to 10 nm.

The surface-tension adjustment layer 15 covering the entire surface of the surface-treatment layer 14 can serve to promote migration of the infrared-reflective pigment 1 to a surface of a coating film when the infrared-reflective pigment 1 is blended to form the coating film. This enables the flat side of a scale-like (plate-shaped) infrared-reflective pigment to be oriented to the surface of the coating film, leading to high infrared reflectivity and high visible-light transparency.

The surface-tension adjustment layer 15 preferably comprises a surface tension modifier including stearic acid. Examples of the surface tension modifier may include oleic acid, phosphonic acid, phosphate ester, and the like other than stearic acid. Combined use of a surface tension modifier other than stearic acid can control migration to a surface of a coating film. For example, the luster of a coating film can be maintained, and the detachment of a pigment from a surface of the coating film can be prevented when the pigment is not exposed on the surface of the coating film.

Next, methods of manufacturing the infrared-reflective pigment 1 according to present embodiment will be described.

[First Method of Manufacture]

Figure 2:
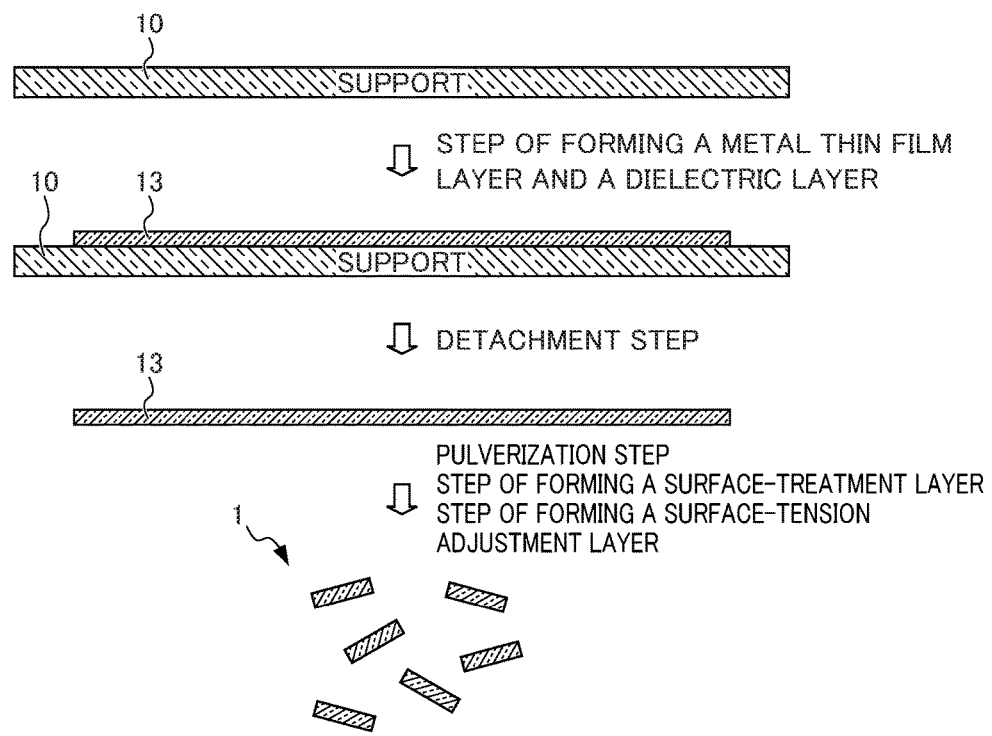
FIG. 2 shows a first method of manufacturing an infrared-reflective pigment according to the present embodiment.

FIG. 2 shows a first method of manufacturing the infrared-reflective pigment 1 according to the present embodiment. As shown in FIG. 2, the first method of manufacturing the infrared-reflective pigment 1 includes the steps of: forming the layered body 13 including the metal thin film layers 11 and the dielectric layer 12 on a support 10 (hereinafter, referred to as the step of forming a metal thin film layer and a dielectric layer), detaching the layered body 13 from the support 10 (hereinafter, referred to as the detachment step), and pulverizing the layered body 13 (hereinafter, referred to as the pulverization step).

First, in the step of forming a metal thin film layer and a dielectric layer, a metal thin film layer and a dielectric layer are layered on one surface (the upper surface in FIG. 2) of the support 10 in an alternate fashion to obtain the layered body 13.

The support 10 may be transparent or opaque, and may be formed of a metal material, a polymer material, an oxide material, glass, and the like.

As a metal material, those generally used for a support and the like may be used. Specific examples include various stainless steels (SUS) such as SUS 304, SUS 316, SUS 316L, SUS 420J2, SUS 630; gold; platinum; silver; copper; nickel; cobalt; titanium; iron; aluminum; tin; or various alloys such as nickel-titanium (Ni—Ti) alloy, nickel-cobalt (Ni—Co) alloy, cobalt-chrome (Co—Cr) alloy, and zinc-tungsten (Zn—W) alloy; inorganic materials such as various ceramic materials; and even metal-ceramics complexes; and the like. These may be used alone independently, or may be used in combination of two or more.

As a polymeric material, various resin films can be used. Specific examples include polyolefin films (polyethylene, polypropylene, and the like), polyester films (polyethylene terephthalate, polyethylene naphthalate, and the like), polyvinyl chloride films, cellulose triacetate films, water-soluble films (natural starch, gelatin, cellulose derivatives such as semisynthetic carboxymethyl cellulose (CMC) and methyl cellulose (MC), polyvinyl alcohol (PVA), polyacrylate-based polymer, polyacrylamide (PAM), polyethylene oxide (PEO)) and the like may be used. Polyester films and water-soluble films are preferably used. Polyester films (hereinafter, polyesters) are preferably formed of a polyester having a film formability and containing a dicarboxylic acid component and a diol component as the main constitutional components.

Among the aforementioned polyesters, terephthalic acid and 2,6-naphthalene dicarboxylic acid are preferred for the dicarboxylic acid component, and a polyester having a main constitutional component of ethylene glycol or 1,4-cyclohexane dimethanol as the diol component is preferred in view of transparency, mechanical strength, dimensional stability, and the like. Among these, preferred are a polyester having polyethylene terephthalate or polyethylene naphthalate as the main constitutional component; a copolymeric polyester composed of terephthalic acid, 2,6-naphthalene dicarboxylic acid, and ethylene glycol; and a polyester having a mixture of two or more of these polyesters as the main constitutional component.

As an oxide material, used are titanium dioxide, aluminum oxide, zirconium oxide, silicon dioxide and the like.

The thickness of the support 10 is preferably 0.01 to 10 mm, and more preferably 0.05 to 5 mm. The support 10 may include two or more layered supports, and in this case, the types of each layered support in the support 10 may be the same, or may be different.

Note that when a material other than a water-soluble film is used as the support 10, a release layer formed from acrylate copolymer resin as a raw material is preferably provided on a surface of the support 10. A release layer may be formed by a known method, and for example, it may be applied by the bar coater method, the dipping method, the spin coater method, the spray method and the like. When a release layer is provided on a surface of the support 10, the layered body 13 having the metal thin film layer 11 and the dielectric layer 12 can easily be detached from the support 10 in the detachment step described below.

The metal thin film layer 11 and the dielectric layer 12 are each formed on the support 10 by the chemical vapor deposition method (CVD), the sputtering method, the solution coating method, the electron beam evaporation method (EB), the ion plating method, the dipping method, the spray method and the like. Among these, the chemical vapor deposition method (CVD), the sputtering method, and the solution coating method are preferably used.

The chemical vapor deposition method (CVD) and the sputtering method can form the layered body 13 having the metal thin film layer 11 and the dielectric layer 12 under publicly known conditions.

According to the solution coating method, a metal-containing solution including a component material of the metal thin film layer 11, and a dielectric substance-containing solution including a component material of the dielectric layer 12 are prepared, and these are then applied in an alternate fashion and dried to form the layered body 13 having the metal thin film layer 11 and the dielectric layer 12.

Coating methods include, for example, the roll coating method, the rod bar coating method, the air knife coating method, the spray coating method, the slide-type curtain coating method, the slide hopper (slide bead) coating method, the extrusion coating method and the like.

The coating amounts of a solution for a metal thin film and a solution of a dielectric substance are appropriately selected so that the film thickness after drying becomes within the preferred range of the desired thickness of each of the metal thin film layer 11 and dielectric layer 12.

Subsequently in the detachment step, the layered body 13 having the metal thin film layer 11 and the dielectric layer 12 is detached from the support 10.

For example, the layered body 13 can be detached from the support 10 by immersing it under an ultrasonic water bath as described below. In a case where a material other than a water-soluble film is used as the support 10, the layered body 13 formed on the support 10 can easily be detached as described above by providing a release layer on a surface of the support 10. Alternatively, in a case where a water-soluble film is used as the support 10, the support 10 dissolves only by being immersed under water, and the layered body 13 can easily be detached.

Subsequently in the pulverization step, the layered body 13 having the metal thin film layer 11 and the dielectric layer 12 which has been detached from the support 10 is pulverized into a desired size.

As the pulverization method, for example, mechanical pulverization with a pulverizer, wet and dry pulverizations with a vibration mill, a ball mill, a jet mill and the like may be used. When wet pulverization is used, any solvent may be used as long as a constitutional component of the layered body 13 does not dissolve therein. It may be, for example, water; alcohols such as methanol, ethanol, isopropanol, n-butyl alcohol, t-butyl alcohol and ethylene glycol; ketones such as acetone, methyl ethyl ketone; esters such as ethyl acetate; halides such as chloroform and methylene chloride; hydrocarbons such as butane and hexane; ethers such as tetrahydrofuran (THF), butyl ether, and dioxane; aromatics such as benzene, xylene, and toluene; amides such as N,N-dimethylformamide (DMF) and dimethylacetamide (DMAc); and solvent mixtures thereof. When dry pulverization is performed, the layered body 13 may be cooled with liquid nitrogen and the like to bring it to a hardened state, and then pulverized.

Alternatively, a method of performing pulverization under an ultrasonic water bath may be used. According to this pulverization method, the layered body 13 formed on the support 10 is immersed into an ultrasonic water bath to allow the layered body 13 to be detached from the support 10, and then the layered body 13 detached is ultrasonically pulverized.

After the pulverization step, classification is preferably performed to obtain a desired particle diameter. For a method of classification, a publicly known dry classifier and the like may be used. For example, used are a classifier with a mesh screen; a gravitational classifier of a horizontal flow-type, an upward flow-type, or the like in which coarse particles and fine powders are classified by taking advantage of the differences in the settling rates and the upward flow rates; a centrifugal classifier in which sedimentation of particles in a centrifugal field is used; an inertial classifier in which particles with large inertia are diverted from the flow line for classification by quickly changing the direction of a particle-carrying air flow.

For the mean particle diameter of the infrared-reflective pigment 1 after pulverization and classification, the number average particle diameter $D_{50}$ is preferably 0.5 to 50 μm, and more preferably 1 to 20 μm. The number average particle diameter $D_{50}$ can be measured by the image analysis method, for example, using a flow-type particle image analyzer "FPIA-3000."

The resulting infrared-reflective pigment 1 is preferably subjected to a step of forming a surface-treatment layer after the pulverization step, and preferably further subjected to a step of forming a surface-tension adjustment layer.

In the step of forming a surface-treatment layer, the surface-treatment layer 14 is formed on the entire surface of the infrared-reflective pigment 1 which has been pulverized in the pulverization step.

Methods of forming the surface-treatment layer 14 include, for example, the pyrolysis method, the neutralization hydrolysis method, the sol-gel method, and the like. By these methods, the surface-treatment layer 14 can be uniformly formed even on the end surface portions of the layered body 13, and the entire surface of the infrared-reflective pigment 1 can be covered with the surface-treatment layer 14.

Specifically, the infrared-reflective pigment 1 obtained after pulverization is, for example, dispersed into distilled water to prepare a slurry, and aqueous sodium aluminate is then added to the slurry. During addition, the pH of the slurry is maintained at about 6.5 by adding sulfuric acid. After the addition of aqueous sodium aluminate is completed, filter separation is performed, and washing is performed with water to obtain the infrared-reflective pigment 1 having the entire surface covered with the surface-treatment layer 14 of aluminum oxide.

Alternatively, in the case of the sol-gel method, a solution of an organometallic compound and the like is hydrolyzed and polycondensed to form a sol, and then gelation is performed. Then, it is heated to obtain the surface-treatment layer 14 of a metal oxide.

In the step of forming a surface-tension adjustment layer, the surface-tension adjustment layer 15 is formed on a surface of the infrared-reflective pigment 1 which has been covered with the surface-treatment layer 14.

As the method of forming the surface-tension adjustment layer 15, the publicly known dipping method may used. Specifically, the layered body 13 having the surface-treatment layer 14 formed thereon is dispersed into, for example, a solution containing stearic acid and petroleum distillates, and then treated in an ultrasonic bath. Subsequently, the resulting dispersion is filtered by aspiration, and washed with a solvent, and then dried. This can provide the surface-tension adjustment layer 15 which covers the surface-treatment layer 14 formed on the surface of the layered body 13.

[Second Method of Manufacture]

FIG. 3 shows a second method of manufacturing the infrared-reflective pigment 1 according to the present embodiment. As shown in FIG. 3, the second method of manufacturing the infrared-reflective pigment 1 includes the steps of: forming a metal thin film layer and a dielectric layer on a support 10A to obtain the layered body 13 (hereinafter, referred to as the step of forming a metal thin film layer and a dielectric layer), and pulverizing the layered body 13 including the support 10A (hereinafter, referred to as the pulverization step). The second method of manufacture differs from the first method of manufacture in that the detachment step is not included, and the support 10A constitutes a part of the infrared-reflective pigment 1.

As the support 10A, transparent materials may be used among those recited with regard to the first method of manufacture. Specifically, transparent materials may be used, including titanium dioxide, aluminum oxide, tin oxide, tin-doped indium oxide (ITO), antimony-doped tin oxide (ATO), zirconium oxide, silicon dioxide, glass and the like. Note that a release layer may not be required on a surface of the support 10A because the detachment step is not included.

The thickness of the support 10A is preferably 0.05 to 100 µm, preferably 0.1 to 50 µm in view of that the support 10A can serve as a substrate for formation of a thin film in the step of forming a metal thin film layer and a dielectric layer, and can easily be pulverized in the pulverization step.

Here, a dielectric thin plate 10a functioning as the dielectric layer 12 may be used as the support 10A. In this case, a transparent material which can constitute the dielectric layer 12 may be used. Specifically, transparent materials including titanium dioxide, aluminum oxide, zirconium oxide, silicon dioxide, and the like may be used. The thickness of the dielectric thin plate 10a is to meet the aforementioned requirement for the thickness of the support 10A, and sufficient for functioning as the dielectric layer 12. Specifically, the thickness of the dielectric thin plate 10a is an integral multiple of $\lambda/4n \pm 10$ nm wherein $\lambda$ is a wavelength of an incident light at around the visible light region, and n is the refractive index of the dielectric thin plate 10a.

In the present embodiment, the metal thin film layer 11 and the dielectric layer 12 are formed on the both sides of the support 10A in the step of forming a metal thin film layer and a dielectric layer. The method of forming the metal thin film layer 11 and the dielectric layer 12 itself is similar to that in the first method of manufacture. For example, the dielectric layer 12 is formed after the metal thin film layer 11 is formed on the both sides of the support 10A. This provides a layered body 13 in which the dielectric layer 12 of the third layer at the middle of the five-layer structure is replaced by the support 10A in the layered body 13 shown in FIG. 1. Note that a metal thin film layer and a dielectric layer are formed on the both sides of the support 10A in the present embodiment, but they may be formed on only one side.

Subsequently, the resulting layered body 13 can be pulverized to obtain the infrared-reflective pigment 1A. The infrared-reflective pigment 1A is preferably subjected to the step of forming a surface-treatment layer after the pulverization step, and preferably further subjected to the step of forming a surface-tension adjustment layer.

The pulverization step, the step of forming a surface-treatment layer, and the step of forming a surface-tension adjustment layer are similar to those in the first method of manufacture.

[Infrared-Reflective Coating Composition]

The infrared-reflective coating composition according to the present embodiment contains the aforementioned infrared-reflective pigment 1.

The infrared-reflective coating composition according to the present embodiment contains the aforementioned infrared-reflective pigment 1 and a resin component as the main components. Types of the coating include organic solvent-type coatings, NAD based coatings, aqueous coatings, emulsion coatings, colloidal coatings, powder coatings, and the like. The infrared-reflective coating composition according to the present embodiment may be manufactured by a publicly known method.

As the infrared-reflective pigment 1, those described above may be used. The content of the infrared-reflective pigment 1 in the infrared-reflective coating composition according to the present embodiment is preferably such that the surface density of pigment is 100 to 300%. The surface density of pigment (%) is a mass ratio (%) of the content of the infrared-reflective pigment actually contained relative to the content required to cover the entire coating surface in just the right amount such that the infrared-reflective pigment is aligned on one plane without mutually overlapping. Specifically, it may be computed by the following expression.

$$\text{Surface density of pigment (\%)} = WCA \text{ (cm}^2\text{/g)} \times PWC \text{ (\%)} \times \text{specific gravity of coating film (g/cm}^3\text{)} \times \text{film thickness (cm)} \quad [\text{Math. 1}]$$

Here, WCA represents the water surface diffusion area per gram, and calculated in accordance with a method based on DIS-K 5906:1998. Note that PWC may be computed by the following expression.

$$PWC \text{ (\%)} = \text{pigment/(solid content of resin+non-volatile component (of additives and the like)+pigment)} \quad [\text{Math. 2}]$$

A solvent, if included, can be selected appropriately in consideration of the coating method, the film-formation conditions, the ability to dissolve a support, and the like. Examples of the solvent include alcohols such as methanol, ethanol, 2-propanol, and 1-butanol; esters such as ethyl acetate, butyl acetate, isobutyl acetate, ethyl propionate, ethylene glycol monomethyl ether acetate, propylene glycol monomethyl ether acetate, and propylene glycol monoethyl ether acetate; ethers such as diethyl ether, propylene glycol monomethyl ether, ethylene glycol monomethyl ether, ethylene glycol monoethyl ether, dioxane, and tetrahydrofuran (THF); glycol derivatives such as ethylene glycol, diethylene glycol, propylene glycol, dipropylene glycol, 1,3-butylene glycol, pentamethylene glycol, and 1,3-octylene glycol; amides such as formamide, N-methylformamide, dimethylformamide (DMF), dimethylacetamide, dimethylsulfoxide (DMSO), and methylpyrrolidone (NMP); ketones such as acetone, methyl ethyl ketone (MEK), methyl propyl ketone, methyl isobutyl ketone, acetylacetone, and cyclohexanone; benzene derivatives such as toluene, xylene, mesitylene, and dodecylbenzene; halogen based solvents such as chloroform and dichloromethylene; and the like.

Resin components include, for example, (a) acrylic resin, (b) polyester resin, (c) alkyd resin, (d) fluororesin, (e) epoxy resin, (f) polyurethane resin, (g) polyether resin and the like. They can be used alone or in combination of two or more.

In particular, acrylic resin and polyester resin are preferably used in view of weather resistance and adhesiveness.

Examples of (a) acrylic resin can include a copolymer of an acrylic monomer and another ethylenic unsaturated monomer. Acrylic monomers which can be used for the copolymer can include esterified substances of acrylic acid or methacrylic acid with methyl, ethyl, propyl, n-butyl, i-butyl, t-butyl, 2-ethylhexyl, lauryl, phenyl, benzyl, 2-hydroxyethyl, 2-hydroxypropyl, and the like; ring-opening addition products of caprolactone with acrylic acid or 2-hydroxyethyl methacrylate; glycidyl acrylate acid or glycidyl methacrylate, acrylamide, methacrylamide and N-methylolacrylamide, (meth)acrylic acid ester of polyhydric alcohol; and the like. Ethylenic unsaturated monomers can include styrene, α-methyl styrene, itaconic acid, maleic acid, vinyl acetate, and the like.

Examples of (b) polyester resin can include saturated polyester resin and unsaturated polyester resin, and specifically, for example, a condensate obtained by performing heat condensation of polybasic acid and polyhydric alcohol. Examples of polybasic acid can include saturated polybasic acid and unsaturated polybasic acid. Examples of saturated polybasic acid can include, for example, phthalic anhydride, terephthalic acid, succinic acid, and the like. Examples of unsaturated polybasic acid can include, for example, maleic acid, maleic anhydride, fumaric acid, and the like. Examples of polyhydric alcohol can include, for example, dihydric alcohol, trihydric alcohol and the like. Examples of dihydric alcohol can include, for example, ethylene glycol, diethylene glycol and the like. Examples of trihydric alcohol can include, for example, glycerin, trimethylolpropane, and the like.

Examples of (c) alkyd resin can include alkyd resins obtained by reacting the above polybasic acid, polyhydric alcohol and property modification material such as fats and fatty acids (soybean oil, linseed oil, coconut oil, stearic acid, and the like), and natural resin (rosin, amber, and the like).

Examples of (d) fluororesin can include either of vinylidene fluoride resin and tetrafluoroethylene resin or a mixture thereof, resins including various fluorine based copolymers which can be obtained by copolymerizing fluoroolefin and polymerizable compounds containing a hydroxy group and other polymerizable vinyl based compounds.

Examples of (e) epoxy resin can include a resin which can be obtained by reacting bisphenol with epichlorohydrin, and the like. Examples of bisphenol can include, for example, bisphenols A and F. Bisphenol-type epoxy resins can include, for example, Epicoat 828, Epicoat 1001, Epicoat 1004, Epicoat 1007, and Epicoat 1009.

Examples of (f) polyurethane resin can include resins having urethane bonds which can be obtained from various polyol components such as acrylic, polyester, polyether, and polycarbonate, and polyisocyanate compounds. The above polyisocyanate compounds can include 2,4-tolylene diisocyanate (2,4-TDI), 2,6-tolylene diisocyanate (2,6-TDI), and a mixture thereof (TDI), diphenylmethane-4,4'-diisocyanate (4,4'-MDI), diphenylmethane-2,4'-diisocyanate (2,4'-MDI), and a mixture thereof (MDI), naphthalene-1,5-diisocyanate (NDI), 3,3'-dimethyl-4,4'-biphenylene diisocyanate, xylylene diisocyanate (XDI), dicyclohexylmethane.diisocyanate (hydrogenated HDI), isophorone diisocyanate (IPDI), hexamethylene diisocyanate (HDI), hydrogenated xylylene diisocyanate (HXDI), and the like.

Examples of (g) polyether resin can include a polymer or copolymer with ether bonds which has 2 hydroxy groups per one molecule of a polyether and the like derived from a polyoxyethylene based polyether, a polyoxypropylene based polyether, or a polyoxybutylene based polyether, or an aromatic polyhydroxy compound such as bisphenol A or Bisphenol F. Moreover, they can include carboxyl-group containing polyether resins which can be obtained by reacting the above polyether resin with a multivalent carboxylic acid such as succinic acid, adipic acid, sebacic acid, phthalic acid, isophthalic acid, terephthalic acid, and trimellitic acid and the like or with reactive derivatives of these acid anhydrides.

The resin components described above are available in both the cured type and the lacquer type, any of which can be used. The cured type may be used in a mixture with a cross-linking agent such as amino resin, a (block) polyisocyanate compound, an amine based compound, a polyamide based compound, and multivalent carboxylic acid, and can promote a curing reaction by heating or at ordinary temperature. Moreover, a lacquer-type resin component and a cured-type resin component can also be used in combination.

The infrared-reflective coating composition according to the present embodiment preferably has a solid content of coating (NV) of 1 to 90 mass % when it is coated. When the solid content of coating falls within the above range, the infrared-reflective pigment can be highly oriented as a coating film shrinks during the drying step after coating, i.e., can be oriented parallel to a surface to be coated. This enables high infrared reflectivity and high visible-light transparency. The solid content of coating is more preferably 1 to 60 mass %.

Note that the infrared-reflective coating composition according to the present embodiment may contain an antisagging agent, a viscosity modifier, an antisettling agent, a cross-linking promoter, a curing agent, a leveling agent, a surface conditioner, a defoaming agent, a plasticizing agent, an antiseptic agent, an antifungal agent, an ultraviolet stabilizer, and the like.

An infrared-reflective coating film can be obtained by coating the resulting infrared-reflective coating composition.

There is no limitation for the method of coating the infrared-reflective coating compound according to the present embodiment. For example, it may be coated with an applicator, a bar coater, a brush, a spray, or a roller.

When the infrared-reflective coating compound according to the present embodiment is coated, the solid content of coating at the time of coating is preferably adjusted as described above so that the infrared-reflective pigment according to the present invention can be highly oriented as the infrared-reflective coating film shrinks.

The film thickness of the infrared-reflective coating film is preferably 0.5 to 100 μm, more preferably 1 to 50 μm as a dry film. A film thickness of less than 0.5 μm may weaken convection associated with solvent evaporation when drying, and thus the pigment is difficult to be oriented to a surface of the resulting coating film. A film thickness of more than 100 μm may tend to cause defects in the resulting coating film such as sagging and foaming.

The drying step after the infrared-reflective pigment is coated is preferably performed at 60 to 200° C., more preferably 80 to 160° C. in order to allow the infrared-reflective pigment according to the present invention to be highly oriented.

The resulting infrared-reflective coating film can have excellent infrared reflectivity as well as extremely excellent visible-light transmittance. A solar heat gain coefficient of 0.7 or less is to be used as evaluation criterion for insufficient heat insulation due to a small heat shielding effect. That is, a solar heat gain coefficient is preferably 0.7 or less, more preferably 0.6 or less.

A visible-light transmittance of 70% or more is to be used as evaluation criterion, which is specified in the safety standards of automobile windshields. That is, the visible-light transmittance is preferably 70% or more, more preferably 80% or more.

The visible-light transmittance and the solar heat gain coefficient can be measured in accordance with a method based on JIS R3106:1998 "Testing method on transmittance, reflectance and emittance of flat glasses and evaluation of solar heat gain coefficient."

Note that the present invention shall not be limited to the above embodiments. Modifications, improvements, and the like within a scope where the object of the present invention can be achieved are included within the present invention.

EXAMPLES

Below, the present invention will be described in detail with reference to Examples, but the present invention shall not be limited to these Examples. Note that the terms "part" and "%" are based on mass unless otherwise stated.

Examples 1 to 13, Comparative Examples 1 to 4

Infrared-reflective coating composition of Examples 1 to 13 and Comparative Examples 1 to 4 were prepared according to the formulations shown in Table 1. In Examples 1 to 3, 5 to 11, and 13 and Comparative Examples 1 to 4, the infrared-reflective pigment 1 was prepared by the first method of manufacture as described above, and in Examples 4 and 12, the infrared-reflective pigment 1A was prepared by the second method of manufacture as described above.

First Method of Manufacture: Manufacture of Infrared-Reflective Pigment 1 (Examples 1 to 3, 5 to 11, and 13, and Comparative Examples 1 to 4)

First, an acrylic resin (ACRYDIC A-1371 from DIC Corporation) was prepared to be 10 mass % (in terms of the solid content) with butyl acetate, and coated on to a 50×50×2 mm glass plate (from T. P Giken) as a support 10 using a spin coater so that the dry film thickness becomes 1 µm. Then, it was dried for 15 minutes at 80° C. to form a release layer.

Next, dielectric layers and metal thin film layer(s) as shown in Table 1 were layered on the above release layer as a first layer up to a seventh layer in an alternate fashion to form a layered body 13. The dielectric layers and the metal thin film layer(s) were formed by the electron beam method using an ULVAC vacuum vapor deposition apparatus (model number: EX-200).

Next, the above layered body 13 was immersed into acetone for 30 minutes to dissolve and detach the release layer, and subjected to ultrasonic pulverization to obtain an infrared-reflective pigment having a number average particle diameter $D_{50}$ of 5 µm.

Next, the infrared-reflective pigment obtained as described above was filtered by aspiration, and then transferred into distilled water, and heated to 45 to 70° C. Sodium aluminate was then added with stirring to be 4 mass % relative to the pigment. The pH of the slurry was maintained at 6 to 9 with sulfuric acid during that period. The infrared-reflective pigment having a surface-treatment layer of aluminum oxide formed thereon was filtered, washed, and dried.

Next, the infrared-reflective pigment having a surface-treatment layer formed thereon was further immersed into ethyl acetate to which 3 mass % of stearic acid has been added, and subjected to sonication to form a surface-tension adjustment layer 15. In a way as described above, the infrared-reflective pigment 1 was obtained.

Second Method of Manufacture: Manufacture of Infrared-Reflective Pigment 1A (Examples 4 and 12)

The infrared-reflective pigment 1A was obtained as in Example 1 except that natural mica plate with a dimension of 50 mm×50 mm×0.5 µm (Yamaguchi mica Co., Ltd.) was used as the support 10A, and dielectric layers and metal layers were provided on the both sides of the substrate.

<Film Thicknesses of Dielectric Layer and Metal Thin Film Layer>

In Examples 1 to 13 and Comparative Examples 1 to 4, dielectric layers and a metal thin film layer(s) were formed to have film thicknesses as shown in Table 1 with a wavelength λ of an incident light at around the visible light region of 300 nm.

Specifically, the optical film thicknesses and actual film thicknesses of titanium dioxide (rutile type), zinc oxide and ITO used for dielectric layers were shown in Table 2 below. For the optical thicknesses of other dielectric layers and metal thin film layers, λ/4 was also similarly computed and the optical thicknesses were set with an integral multiple of λ/4±10 nm, and then the actual thicknesses were set in accordance with the calculations thereof.

Note that a crystal oscillation-type film forming controller ("CRTM-6000G" from ULVAC, Inc.) was used to control a film thickness.

Next, each infrared-reflective pigment prepared was mixed with ethyl acetate and stirred, and then a DIC acrylic resin "ACRYDIC A405" was added to give the surface density of pigment as shown in Table 1, and stirred to obtain each infrared-reflective coating composition having a solid content of coating of 40 mass %. WCA of the infrared-reflective pigment of each of Examples and Comparative Examples was as described in Table 1. In all of Examples 1 to 13 and Comparative Examples 1 to 4, the specific gravities of the coating films were 1.4 (g/cm$^3$), and the film thicknesses were 30 µm (30×10$^{-4}$ cm).

Next, each infrared-reflective coating composition was applied to a glass plate with an 8-MIL applicator. The amount of coating was adjusted so that the film thickness after drying became 30 µm. After coating, it was allowed to stand for 10 minutes at room temperature, and then dried for 15 minutes at 110° C. This yielded each infrared-reflective coating film.

[Visible Light Transmittance, Solar Heat Gain Coefficient]

The infrared-reflective coating film of each of Examples and Comparative Examples was measured for a visible light transmittance and a solar heat gain coefficient. A visible light transmittance and a solar heat gain coefficient were measured in accordance with a method based on JIS R 3106: 1998 "Testing method on transmittance, reflectance and emittance of flat glasses and evaluation of solar heat gain coefficient." A spectrophotometer from Shimadzu Corporation Corp. (model number: UV3600) was used for measurements. Results are shown in Table 1.

[Weather Resistance]

The infrared-reflective coating film of each of Examples and Comparative Examples was subjected to the super accelerated weathering (SUV) test. The coating film after the test was visually evaluated for the degree of deterioration. The test conditions and evaluation criteria were as follows. Results are shown in Table 1.

(Test Conditions)

Measurement testing machine: a Sunshine weather meter "S80-B-H"

light irradiation intensity: 850 W/cm²

Irradiation time: 600 hours (Evaluation Criteria)

3: No problem in appearance

2: A coating film has somewhat vaguely whitish and translucent appearance, showing mild deterioration.

1: A coating film has vaguely whitish and opaque appearance, showing deterioration.

TABLE 1

|  |  |  | Example 1 | Example 2 | Example 3 | Example 4 | Example 5 |
|---|---|---|---|---|---|---|---|
| Pigment | First layer | Material | TiO₂(Rutile) | ZnO | TiO₂(Rutile) | TiO₂(Rutile) | TiO₂(Rutile) |
|  |  | Film thickness | 28 nm | 41 nm | 29 nm | 28 nm | 28 nm |
|  | Second layer | Material | Ag | Ag | Ag | Ag | Ag |
|  |  | Film thickness | 14 nm | 10 nm | 20 nm | 10 nm | 14 nm |
|  | Third layer | Material | TiO₂(Rutile) | ZnO | TiO₂(Rutile) | TiO₂(Rutile) | TiO₂(Rutile) |
|  |  | Film thickness | 56 nm | 82 nm | 29 nm | 28 nm | 56 nm |
|  | Fourth layer | Material | Ag | Ag | — | Mica | Ag |
|  |  | Film thickness | 14 nm | 10 nm | — | 500 nm | 14 nm |
|  | Fifth layer | Material | TiO₂(Rutile) | ZnO | — | TiO₂(Rutile) | TiO₂(Rutile) |
|  |  | Film thickness | 28 nm | 41 nm | — | 28 nm | 28 nm |
|  | Sixth layer | Material | — | — | — | Ag | — |
|  |  | Film thickness | — | — | — | 10 nm | — |
|  | Seventh layer | Material | — | — | — | TiO₂(Rutile) | — |
|  |  | Film thickness | — | — | — | 28 nm | — |
|  | Surface-treatment layer |  | Aluminum oxide | Aluminum oxide | Aluminum oxide | Aluminum oxide | Silica |
|  | Film thickness of surface-treatment layer |  | 5 nm | 5 nm | 5 nm | 5 nm | 5 nm |
|  | Surface-tension adjustment layer |  | Stearic acid | Stearic acid | Stearic acid | Stearic acid | Stearic acid |
|  | WCA (cm²/g) |  | 12600 | 8700 | 21000 | 11000 | 13000 |
| Coating material | Surface density of Pigment |  | 150% | 150% | 150% | 150% | 150% |
|  | Solid content of coating |  | 40 mass % | 40 mass % | 40 mass % | 40 mass % | 40 mass % |
|  | Thickness of dried coating film |  | 30 μm | 30 μm | 30 μm | 30 μm | 30 μm |
| Coating film | Visible light transmittance |  | 86% | 84% | 87% | 86% | 82% |
|  | Solar heat gain coefficient |  | 0.65 | 0.55 | 0.67 | 0.61 | 0.63 |
|  | Weather resistance |  | 3 | 3 | 3 | 3 | 3 |

|  |  |  | Example 6 | Example 7 | Example 8 | Example 9 |
|---|---|---|---|---|---|---|
| Pigment | First layer | Material | TiO₂(Rutile) | Al₂O₃ | TiO₂(Rutile) | TiO₂(Rutile) |
|  |  | Film thickness | 28 nm | 5 nm | 28 nm | 28 nm |
|  | Second layer | Material | Ag | TiO₂(Rutile) | Ag | Ag |
|  |  | Film thickness | 14 nm | 28 nm | 14 nm | 14 nm |
|  | Third layer | Material | TiO₂(Rutile) | Ag | TiO₂(Rutile) | TiO₂(Rutile) |
|  |  | Film thickness | 56 nm | 14 nm | 56 nm | 56 nm |
|  | Fourth layer | Material | Ag | TiO₂(Rutile) | Ag | Ag |
|  |  | Film thickness | 14 nm | 56 nm | 14 nm | 14 nm |
|  | Fifth layer | Material | TiO₂(Rutile) | Ag | TiO₂(Rutile) | TiO₂(Rutile) |
|  |  | Film thickness | 28 nm | 14 nm | 28 nm | 28 nm |
|  | Sixth layer | Material | — | TiO₂(Rutile) | — | — |
|  |  | Film thickness | — | 28 nm | — | — |
|  | Seventh layer | Material | — | Al₂O₃ | — | — |
|  |  | Film thickness | — | 5 nm | — | — |
|  | Surface-treatment layer |  | Zirconium oxide | None | None | None |
|  | Film thickness of surface-treatment layer |  | 5 nm | — | — | — |
|  | Surface-tension adjustment layer |  | Stearic acid | Stearic acid | Stearic acid | None |
|  | WCA (cm²/g) |  | 12000 | 13000 | 13000 | 13000 |
| Coating material | Surface density of Pigment |  | 150% | 150% | 150% | 150% |
|  | Solid content of coating |  | 40 mass % | 40 mass % | 40 mass % | 40 mass % |
|  | Thickness of dried coating film |  | 30 μm | 30 μm | 30 μm | 30 μm |
| Coating film | Visible light transmittance |  | 80% | 86% | 77% | 72% |
|  | Solar heat gain coefficient |  | 0.55 | 0.57 | 0.5 | 0.51 |
|  | Weather resistance |  | 3 | 2 | 1 | 1 |

|  |  |  | Example 10 | Example 11 | Example 12 | Example 13 | Comparative Example 1 |
|---|---|---|---|---|---|---|---|
| Pigment | First layer | Material | ITO | ITO | ITO | Al₂O₃ | ITO |
|  |  | Film thickness | 40 nm | 40 nm | 40 nm | 5 nm | 130 nm |
|  | Second layer | Material | Ag | Ag | Ag | ITO | — |
|  |  | Film thickness | 14 nm | 20 nm | 10 nm | 40 nm | — |
|  | Third layer | Material | ITO | ITO | ITO | Ag | — |
|  |  | Film thickness | 80 nm | 40 nm | 40 nm | 14 nm | — |
|  | Fourth layer | Material | Ag | — | Mica | ITO | — |
|  |  | Film thickness | 14 nm | — | 500 nm | 80 nm | — |
|  | Fifth layer | Material | ITO | — | ITO | Ag | — |
|  |  | Film thickness | 40 nm | — | 40 nm | 14 nm | — |

TABLE 1-continued

|  |  |  |  |  |  |  |  |
|---|---|---|---|---|---|---|---|
|  | Sixth layer | Material | — | — | Ag | ITO | — |
|  |  | Film thickness | — | — | 10 nm | 40 nm | — |
|  | Seventh layer | Material | — | — | ITO | $Al_2O_3$ | — |
|  |  | Film thickness | — | — | 40 nm | 5 nm | — |
|  | Surface-treatment layer |  | Aluminum oxide | Aluminum oxide | Aluminum oxide | None | None |
|  | Film thickness of surface-treatment layer |  | 5 nm | 5 nm | 5 nm | — | — |
|  | Surface-tension adjustment layer |  | Stearic acid | Stearic acid | Stearic acid | Stearic acid | None |
|  | WCA ($cm^2/g$) |  | 6100 | 10900 | 5900 | 5800 | 18000 |
| Coating material | Surface density of Pigment |  | 150% | 150% | 150% | 150% | 150% |
|  | Solid content of coating |  | 40 mass % | 40 mass % | 40 mass % | 40 mass % | 40 mass % |
|  | Thickness of dried coating film |  | 30 μm | 30 μm | 30 μm | 30 μm | 30 μm |
| Coating film | Visible light transmittance |  | 82% | 85% | 80% | 82% | 80% |
|  | Solar heat gain coefficient |  | 0.6 | 0.64 | 0.57 | 0.6 | 0.78 |
|  | Weather resistance |  | 3 | 3 | 3 | 2 | 1 |

|  |  |  |  | Comparative Example 2 | Comparative Example 3 | Comparative Example 4 |
|---|---|---|---|---|---|---|
| Pigment | First layer | Material |  | Ag | Ag | Ag |
|  |  | Film thickness |  | 10 nm | 20 nm | 10 nm |
|  | Second layer | Material |  | — | — | $TiO_2$(Rutile) |
|  |  | Film thickness |  | — | — | 28 nm |
|  | Third layer | Material |  | — | — | Ag |
|  |  | Film thickness |  | — | — | 10 nm |
|  | Fourth layer | Material |  | — | — | — |
|  |  | Film thickness |  | — | — | — |
|  | Fifth layer | Material |  | — | — | — |
|  |  | Film thickness |  | — | — | — |
|  | Sixth layer | Material |  | — | — | — |
|  |  | Film thickness |  | — | — | — |
|  | Seventh layer | Material |  | — | — | — |
|  |  | Film thickness |  | — | — | — |
|  | Surface-treatment layer |  |  | None | None | None |
|  | Film thickness of surface-treatment layer |  |  | — | — | — |
|  | Surface-tension adjustment layer |  |  | None | None | None |
|  | WCA ($cm^2/g$) |  |  | 95000 | 48000 | 31000 |
| Coating material | Surface density of Pigment |  |  | 150% | 150% | 150% |
|  | Solid content of coating |  |  | 40 mass % | 40 mass % | 40 mass % |
|  | Thickness of dried coating film |  |  | 30 μm | 30 μm | 30 μm |
| Coating film | Visible light transmittance |  |  | 68% | 39% | 66% |
|  | Solar heat gain coefficient |  |  | 0.62 | 0.32 | 0.46 |
|  | Weather resistance |  |  | 1 | 1 | 1 |

TABLE 2

|  | Rutile-typeTiO$_2$ (Refractive index, n = 2.7) | ZnO (Refractive index, n = 1.83) | ITO (Refractive index, n = 1.9) |
|---|---|---|---|
| Optical film thickness (nm) | λ/4 = 75 | λ/4 = 75 | λ/4 = 75 |
| Film thickness (nm) | 28 = 75/2.7 | 41 = 75/1.83 | 39 = 75/1.9 |

Table 1 reveals that in all of Comparative Examples 1 to 4, a coating film having a visible light transmittance of 70% or more relative to the evaluation criterion and a solar heat gain coefficient of 0.7 or less relative to the evaluation criterion was not obtained. In contract, it was found that in all of Examples 1 to 13, a coating film having a visible light transmittance of 70% or more and a solar heat gain coefficient of 0.7 or less was obtained. These results demonstrates that high infrared-light reflectivity and high visible-light transparency can be obtained according to a scale-like infrared-reflective pigment, comprising a layered body including at least one metal thin film layer and at least two transparent dielectric layers, the thicknesses of the dielectric layers being (an integral multiple of λ/4n)±10 nm (the optical film thickness is (an integral multiple of λ/4)±10 nm) wherein λ is a wavelength (300 nm in the present embodiment) of an incident light at around the visible light region, and n is the refractive index of each of the dielectric layers.

Further, it was found that excellent weather resistance was obtained for Examples 1 to 6, 10 to 12 in each of which a surface-treatment layer was provided for, as compared with Examples 7 to 9 and 13 in which no surface-treatment layer was provided. These results demonstrate that deterioration of resin can be controlled, and excellent weather resistance can be obtained according to the infrared-reflective pigment of the present invention having a surface-treatment layer including an oxide and covering a surface of the layered body.

Further, it was found that higher visible light transmittance was obtained for Examples 1 to 8, 10 to 13 in each of which a surface-tension adjustment layer was provided, as compared with Example 9 in which no surface-tension adjustment layer was provided. These results demonstrate that higher visible light transmittance can be obtained according to the infrared-reflective pigment of the present invention further having a surface-tension adjustment layer including a surface tension modifier and covering a surface of the surface-treatment layer.

EXPLANATION OF REFERENCE NUMERALS 1, 1A Infrared reflective pigment
10, 10A Support
11 Metal thin film layer
12 Dielectric layer 13 Layered body
14 Surface-treatment layer
15 Surface-tension adjustment layer

The invention claimed is:
1. A scale-like infrared-reflective pigment, consisting of:
a layered body consisting of one metal thin film layer and two transparent dielectric layers, or two metal thin film layers and three transparent dielectric layers wherein the metal thin film layer or layers and the transparent dielectric layer or layer are in an alternate fashion so that two transparent dielectric layers are disposed on both sides of a metal thin film layer,
a surface-treatment layer formed as needed, including an oxide, and covering a surface of the layered body, and
a surface-tension adjustment layer formed as needed, comprising a surface tension modifier including stearic acid, and covering a surface of the surface-treatment layer,
wherein each metal thin film layer only includes silver,
wherein each metal thin film layer has a film thickness of 8 to 20 nm,
wherein the thicknesses of the dielectric layers being (an integral multiple of $\lambda/4n$)±10 nm, and
wherein a wavelength $\lambda$ of an incident light is 180 to 980 nm, and n is a refractive index of each of the dielectric layers, the integer being 1 to 4.

2. The infrared-reflective pigment according to claim 1, wherein the dielectric layers composes at least one selected from the group consisting of titanium dioxide, zinc oxide, aluminum oxide, zirconium oxide, silicon dioxide, tin oxide, tin-doped indium oxide, and antimony-doped tin oxide.

3. The infrared-reflective pigment according to claim 1, wherein the surface-treatment layer comprises at least one selected from the group consisting of aluminum oxide, silica, and zirconium oxide.

4. An infrared-reflective coating composition comprising the infrared-reflective pigment according to claim 1.

* * * * *